United States Patent [19]
Feltz et al.

[11] Patent Number: 5,661,094
[45] Date of Patent: Aug. 26, 1997

[54] SINTERED CERAMIC FOR HIGH-STABILITY THERMISTORS AND METHOD FOR PRODUCTION THEREOF

[75] Inventors: Adalbert Feltz; Friedrich-Franz Rosc, both of Deutschlandsberg, Austria

[73] Assignee: Siemens Matsushita GmbH & Co. Kg, Munich, Germany

[21] Appl. No.: 490,358

[22] Filed: Jun. 14, 1995

[30] Foreign Application Priority Data

Jun. 14, 1994 [DE] Germany ............. 44 20 657.7

[51] Int. Cl.⁶ ............. C04B 35/36; C04B 35/64; H01C 7/04
[52] U.S. Cl. ............. 501/126; 252/62.3 T; 252/519
[58] Field of Search ............. 252/519, 62.3 T; 501/126; 338/22 R

[56] References Cited

U.S. PATENT DOCUMENTS

| 2,645,700 | 7/1953 | Morin | 252/519 |
| 3,510,820 | 5/1970 | Jonker et al. | 252/519 |

FOREIGN PATENT DOCUMENTS

| 609776 | 8/1994 | European Pat. Off. |
| 0609776 | 8/1994 | European Pat. Off. |
| 1226789 | 3/1971 | United Kingdom |

OTHER PUBLICATIONS

Siemens Zeitschrift 47, Jan. 1973, No. 1, pp. 65–67, (Walch).

Primary Examiner—Melissa Bonner
Attorney, Agent, or Firm—Herbert L. Lerner; Laurence A. Greenberg

[57] ABSTRACT

A sintered ceramic for high-stability thermistors is based on $Ni_xMn_{3-x}O_4$, where $x>0$. The sintered ceramic has the general formula $Cu_zFe_{1-y}Ni_xMn_{2-x-z+y}O_4$, where $z=0$ to 1.5; $y=-0.1$ to 0.02; and $1>z>0.5$. A method for producing a sintered ceramic for high-stability thermistors includes converting a mixture of starting materials $MnO_x$, NiO and $Fe_2O_3$ into a stable ceramic of an iron-nickel-manganese oxide spinel phase with high thermal stability and aging stability. Another method for producing a sintered ceramic for high-stability thermistors includes calcining a mixture of nickel carbonate, manganese carbonate and α-iron (III) oxide by heating to over 600° C. in air. After granulometric preparation and compression molding, sintered ceramic bodies are produced by sintering in air or in an oxygen atmosphere.

10 Claims, 3 Drawing Sheets

Range of occurrence of stable iron-nickel-manganese oxide spinels with increased aging stability in the $FeNi_xMn_{2-x}O_4$ series

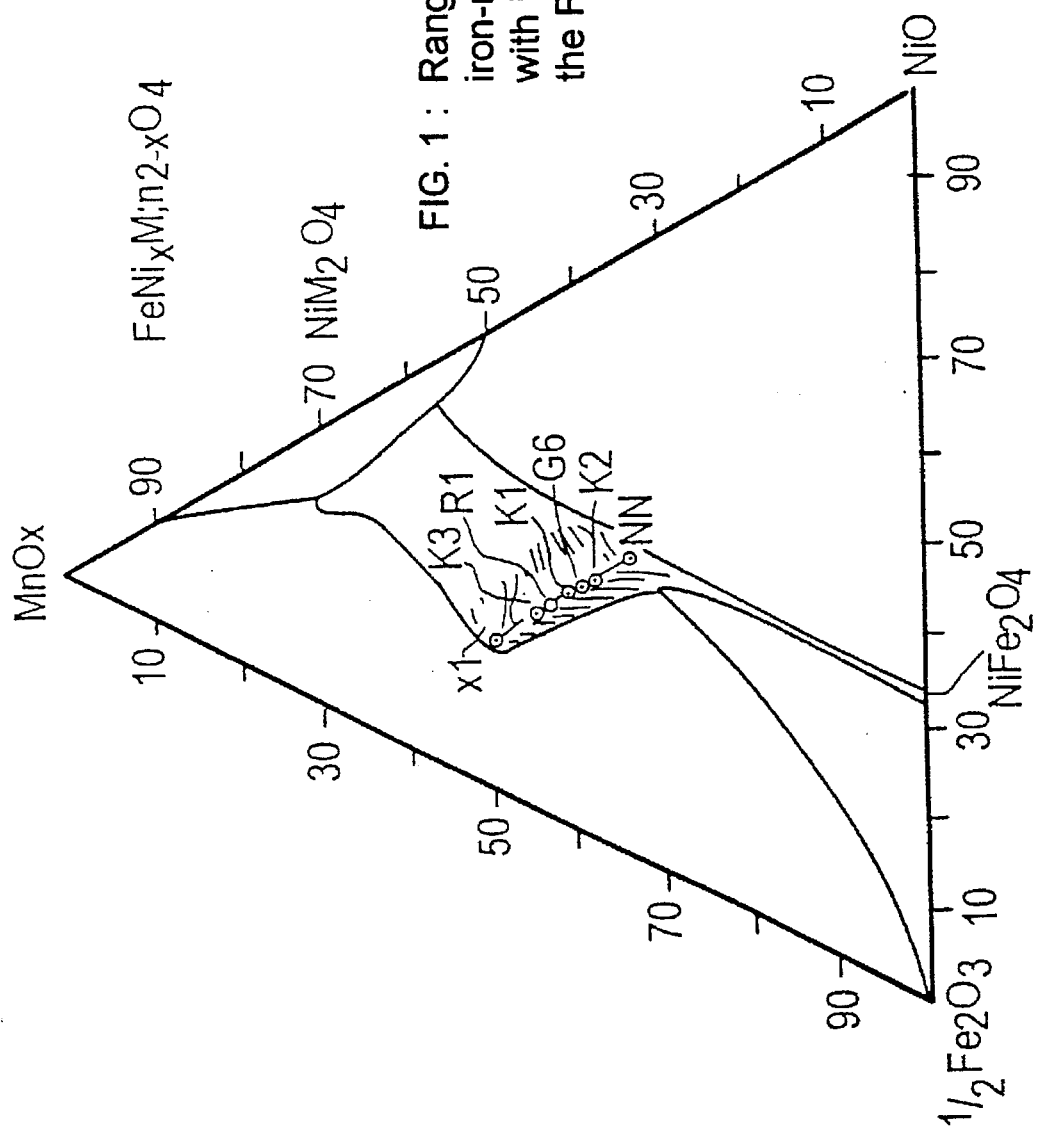

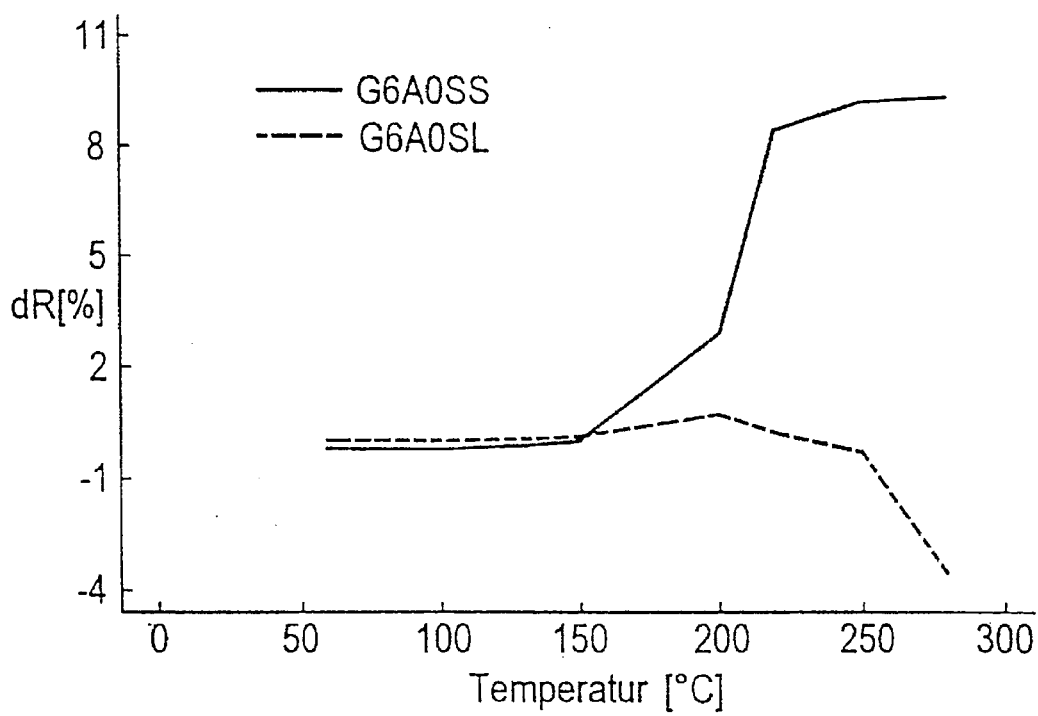
FIG. 2: Change in resistance dR in percent as a function of the holding temperature T (72 hours in each case) for ceramic components
$FeNi_{0.833}Mn_{1.167}O_4(G6)$
after rapid cooling of the contacted parts (approximately 800 K/h) (SS) and a very slow cooling resulting in pre-aging (SL)

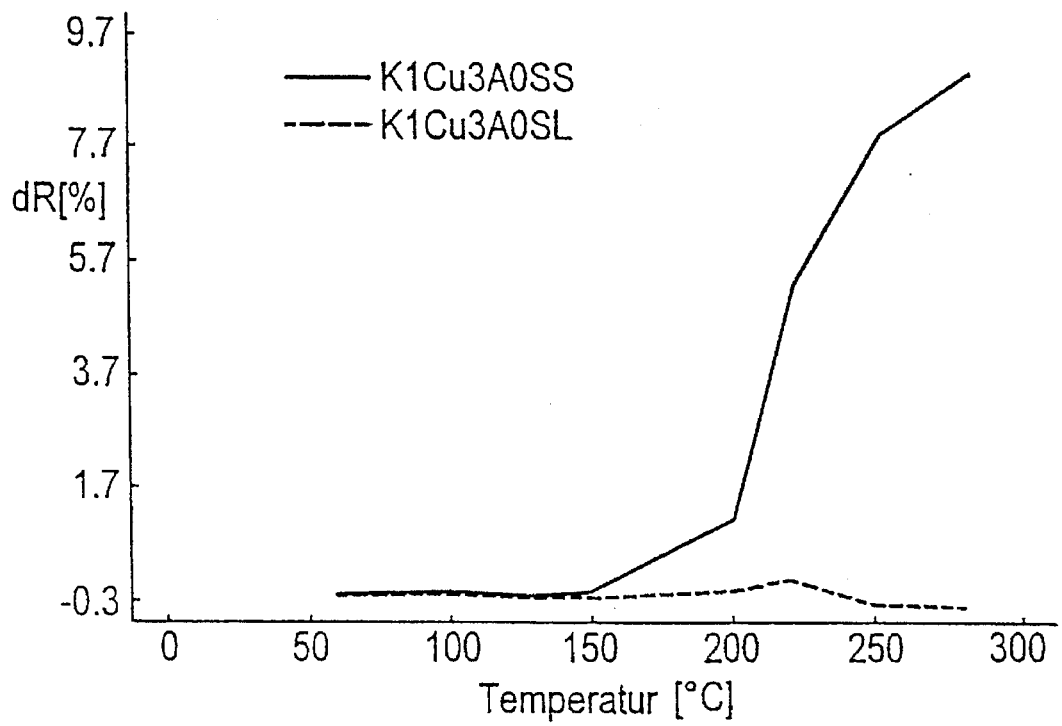
FIG. 3: Change in resistance dR in percent as a function of the holding temperature T (72 hours in each case) for ceramic components
$$Cu_{0.03}Fe_{0.99}Ni_{0.755}Mn_{1.225}O_4 \quad (K1Cu3)$$
after rapid cooling of the contacted parts (approximately 800 K/h) (SS) and a very slow cooling resulting in pre-aging (SL)

SINTERED CERAMIC FOR HIGH-STABILITY THERMISTORS AND METHOD FOR PRODUCTION THEREOF

BACKGROUND OF THE INVENTION

1. Field of the Invention

The invention relates to a sintered ceramic for high-stability thermistors based on $Ni_xMn_{3-x}O_4$, where $x>0$. The invention also relates to a method for the production of such a sintered ceramic.

Ceramic materials of that generic type have also gained importance as thin films in radiation receivers.

British Patent Specification 1 266 789, for instance, discloses technical versions based on semiconducting oxides of the transition elements and combinations thereof, for instance in spinels. Multiphase systems, such as cobalt-manganese-oxide systems, are often used, as modified by further components such as copper oxide, nickel oxide or lithium oxide (see U.S. Pat. No. 3,219,480, for example), without seeking the advantage of forming a uniform phase. A rated resistance $R_{25}$ (electrical resistance of the thermistor at $T=25°$ C.), and a B constant that is definitive for the sensitivity of the temperature measurements, according to the equation:

$$R(T)=R_0 exp(B/T)=R_{25}exp(1/T-1/298)$$

is adjusted to variable values, on the basis of such multiphase systems, by suitably carrying out the reaction in the sintering process, so that for a given composition, it is possible to produce a certain assortment of thermistors. That kind of procedure generally exhibits considerable scattering of the data of the individual specimens and in particular from one batch to another, since the electrical parameters that characterize the thermistor assume different values, depending on the microstructure which is attained. In such heterogeneous systems, the equilibrium composition of the phases is generally pressure-dependent, which has negative effects on the stability of the electrical parameters over time.

The publication entitled: Siemens Zeitschrift [Siemens Journal] 47, January 1973, No. 1, pp. 65–67, discloses the making of thermistors based on the $Ni_xMn_{3-x}O_4$ system. In the case of the composition range of $0<x<1.275$, a largely uniform phase results, which no longer has the aforementioned disadvantages of pronounced scattering, on the condition that a ceramic microstructure is attained, but that is associated with the use of a special sintering aid. When the sintering process for thermistor production is carried out, heat composition into a heterogeneous mixture must be avoided with those oxide semiconductors that have a uniform phase condition, when the temperature is below $720°$ C. in the air. The application range is therefore limited to approximately $150°$ C.

In spinel compounds of the $Ni_xMn_{3-x}O_4$ system, in which in accordance with the general formula:

a stepwise substitution of manganese with magnesium was performed, it was possible with increasing magnesium content to demonstrate a drop in the temperature at which the oxidative decomposition begins, and to attain complete stability for the composition $MgNiMnO_4$ (where $z=1$). That is described in German Published, Non-Prosecuted Application DE 42 13 631 A1, corresponding to U.S. application Ser. No. 08/328,074, filed Oct. 24, 1994.

It is disadvantageous that in the high temperature range which is associated with the deposition of an NiO phase, the temperature of the oxygen splitoff in an $O_2$ atmosphere is reduced from $975°$ C. for $NiMn_2O_4$ to $680°$ C. for $MgNiMnO_4$. In order to attain an adequate sintering densification, the process must therefore be carried out by exceeding the upper limit of stability and must go through a heterogeneous stage. In other words, a homogeneous ceramic is not obtained until a generally time-consuming reoxidation occurs at temperatures of less than $700°$ C., in which unification of the phases takes place. The disadvantages can be eliminated by incorporating $Fe^{III}$ into the $Ni_xMn_{3-x}O_4$ system in a

which is performed by generating an equivalent of manganese (III) and at the same time of manganese (IV) that are required for conductivity by incorporating iron at the B sites of the spinel lattice; and for the cubic spinel $FeNiMnO_4$, with a cation distribution as follows:

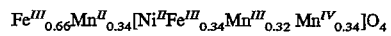

as derived from Mössbauer measurements, an upper decomposition temperature $T_z=1020°$ C. in air is attained. It has been found that a semiconductor ceramic of that composition is distinguished by a significantly high aging stability. That has been described in European Patent Application 0 609 776, corresponding to U.S. application Ser. No. 08/191,087.

SUMMARY OF THE INVENTION

It is accordingly an object of the invention to provide a sintered ceramic for high-stability thermistors and a method for the production thereof, which overcome the hereinafore-mentioned disadvantages of the heretofore-known products and methods of this general type, in which the sintered ceramic expands the range of variation of the B constant and the specific electrical conductivity of a sintered ceramic for thermistors of high thermal stability and sensitivity, with simultaneously high aging stability, in order to enable adaptation to predetermined characteristic curves, and in which the method avoids a transition to a heterogeneous system in the process of carrying out the sintering, and a sintering aid can be dispensed with, as a result of which a stable NTC ceramic is assured.

With the foregoing and other objects in view there is provided, in accordance with the invention, in a sintered ceramic for high-stability thermistors based on $Ni_xMn_{3-x}O_4$, where $x>0$, the improvement comprising the general formula $Cu_zFe_{1-y}Ni_xMn_{2-x-z+y}O_4$, where $z=0$ to $1.5$; $y=-0.1$ to $0.02$; and $1>x>0.5$.

In accordance with another feature of the invention, $z=0$; $y=0$; and $x=0.5$ to $1$.

In accordance with a further feature of the invention, $z=0.03$; $y=0.01$; and $x=0.862$, $0.755$, $0.693$ or $0.627$.

In accordance with an added feature of the invention, $z=0.007$; $Y=0.002$; and $x=0.869$ or $0.761$.

In accordance with an additional feature of the invention, $z=0.015$; $y=0.005$; and $x=0.867$ or $0.759$.

In accordance with yet another feature of the invention, a values triplet includes $z=0.03$; $y=0.03$; and $x=0.70$ or $0.633$.

In accordance with yet a further feature of the invention, a values triplet includes $z=0.06$; $y=0.02$; and $x=0.633$ or $y=0.06$; and $x=0.633$.

In accordance with yet an added feature of the invention, a values triplet includes z=0.15; y=0.05; and x=0.60 or y=0.15; and x=0.633.

With the objects of the invention in view, there is also provided a method for producing a sintered ceramic for high-stability thermistors, which comprises converting a mixture of starting materials $MnO_x$, NiO and $Fe_2O_3$ into a stable ceramic of an iron-nickel-manganese oxide spinel phase with high thermal stability and aging stability.

With the objects of the invention in view, there is also provided a method for producing a sintered ceramic for high-stability thermistors, which comprises calcining a mixture of nickel carbonate, manganese carbonate and α-iron (III) oxide by heating to over 600° C. in air; and producing sintered ceramic bodies from the calcinate by sintering in air or in an oxygen atmosphere, after granulometric preparation and compression molding.

In accordance with another mode of the invention, there is provided a method which comprises adding copper oxide to the mixture.

In accordance with a further mode of the invention, there is provided a method which comprises adding a sintering aid to the calcinate before and after the granulometric preparation, subsequently shaping into tablets, preferably by a compression process, and sintering the tablets in an air atmosphere at temperatures of from 1020° to 1200° C., forming a uniform spinel phase.

In accordance with an added mode of the invention, there is provided a method which comprises carrying out the step of adding the sintering aid by adding lead germanate or bismuth oxide.

In accordance with a concomitant mode of the invention, there is provided a method which comprises carrying out tempering at a temperature of from 800° C. to 900° C., after the sintering step.

Other features which are considered as characteristic for the invention are set forth in the appended claims.

Although the invention is illustrated and described herein as embodied in a sintered ceramic for high-stability thermistors and a method for the production thereof, it is nevertheless not intended to be limited to the details shown, since various modifications and structural changes may be made therein without departing from the spirit of the invention and within the scope and range of equivalents of the claims.

The structure and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a material diagram for semiconducting ceramics according to the invention;

FIG. 2 is a diagram of a relationship between temperature and resistance in the aging of a special ceramic of FIG. 1; and FIG. 3 is a diagram similar to FIG. 2, for a further special ceramic of FIG. 1.

DESCRIPTION OF THE PREFERRED EMBODIMENTS

The nucleus of the invention is considered to be obtaining spinels with high aging stability and favorable conductivity parameters for NTC applications, by varying proportions of nickel and manganese in:

$Fe_{1-y}Ni_xMn_{2-x+y}O_4$ series, where
$-0.1 < y < 0.02$ and
$1 > x > 0.5$ and moreover, by means of additives of copper oxide corresponding to:

$Cu_zFe_{1-y}Ni_xMn_{2-x-z+y}O_4$, where
$z = 0$ to $1.5$; $y = -0.1$ to $0.02$, and
$1 > x > 0.5$ to widen the range of parameters of electrical properties, while attaining a high thermal stability and aging stability. The high aging stability can be expanded, according to the invention, beyond the temperature range from room temperature to 150° C., to 250° C. or 280° C., by means of pre-aging.

In a special embodiment, it is possible to have z=0, y=0 and x=0.5 to 1. The following values are provided in particular:

$z = 0.03$; $y = 0.01$; $x = 0.862, 0.755$ or $0.627$
$z = 0.007$; $y = 0.002$; $x = 0.869$ or $0.761$
$z = 0.015$; $y = 0.005$; $x = 0.867$ or $0.759$
$z = 0.03$; $y = 0.03$; $x = 0.70$ or $0.633$
$z = 0.06$; $y = 0.02$; $x = 0.633$ or $y = 0.06$; $x = 0.633$
$z = 0.015$; $y = 0.05$; $x = 0.60$ or $y = 0.15$; $x = 0.633$

Referring now to the figures of the drawing in detail and first, particularly, to FIG. 1 thereof, it is seen that the range of spinels that are stable in air upon cooling in the $Fe_{1-y}Ni_xMn_{3-x+y}O_4$ system, with the high aging stability ascertained in the range of $-0.1<y<0.02$ and $1>x>0.5$, with simultaneously high thermal stability, is shown in graph form. The NTC semiconductor ceramic specimens that can be represented by a shaded area of the composition and that are marked X1, K1–K3, R1, G6 and NN, are characterized by a relatively slight alteration in the conductivity parameters during aging and high long-term stability of the values, which in the pre-aged state extend past 150° C. to reach approximately 280° C.

Production methods according to the invention will be described in further detail in terms of the following examples:

In a first embodiment, a mixture of the starting materials $MnO_x$, NiO and $Fe_2O_3$ is converted into a stable ceramic of an iron-nickel-manganese oxide spinel phase of high thermal stability and aging stability. The mixture can have copper oxide added to it in certain proportions.

In a second embodiment, mixtures of the corresponding composition, being formed of α-$Fe_2O_3$ (α-iron (III)-oxide), manganese carbonate and nickel carbonate, each with a known content of metal cations, are calcined at a temperature of over 600° C., and preferably 650° C. After granulometric preparation, shaping is performed by pressure and sintering in air at temperatures of from 1050° C. to 1200° C., the precise value of which should be adjusted as closely as possible to the temperature of decomposition, which varies somewhat depending on the composition, and ensuing tempering at 800° C. to 900° C. produce an optimal ceramic microstructure with a relative density of 85 to 90%, that is equivalent to the requirements made of thermistors with high replicability and stability. Before as well as after the granulometric preparation, a sintering aid in the form of lead germanate or bismuth oxide can be added to the calcined mixture.

Table 1 gives examples of the sintered ceramic according to the invention, which has high aging stability and at the same time high uniformity and phase stability, for use in high-stability, high-sensitivity thermistors.

The high stability of the electrical properties of the ceramic specimens shown in a shaded area of FIG. 1 are illustrated in FIGS. 2 and 3 by a slight time dependency of electrical values during the aging. These drawing figures each show the change in resistance dR in percent as a function of a holding temperature T, in FIG. 2 for the ceramic specimen G6 of FIG. 1 and in FIG. 3 for the ceramic specimens K1 of FIG. 1.

Table 1: Composition and electrical properties, temperature $T_z$ at which $O_2$ splitoff and NiO deposition ensue, as well as relative density D of the spinel ceramic $FeNi_xMn_{2-x}O_4$, and their modifications by the incorporation of copper in the $Cu_zFe_{1-y}Ni_xMn_{2-x-z+y}O_4$ series.

| Specimen No. | z | y | x | Composition | D/% | $T_z$/°C. | $\rho(25°\,C.)\Omega$ cm | B/K |
|---|---|---|---|---|---|---|---|---|
| 1(N/N) | 0 | 0 | 1 | $FeNiMnO_4$ | 82 | 950 | 2710 | 3210 |
| 2(K2) | 0 | 0 | 0.871 | $FeNi_{0.871}Mn_{1.129}O_4$ | 87 | | 5140 | 3440 |
| 3 | 0.007 | 0.002 | 0.869 | $Cu_{0.007}Fe_{0.998}Ni_{0.869}Mn_{1.126}O_4$ | 92 | | 4160 | 3410 |
| 4 | 0.015 | 0.005 | 0.867 | $Cu_{0.015}Fe_{0.995}Ni_{0.867}Mn_{1.123}O_4$ | 91 | | 3710 | 3370 |
| 5 | 0.03 | 0.01 | 0.862 | $Cu_{0.03}Fe_{0.99}Ni_{0.862}Mn_{1.118}O_4$ | 90 | | 9420 | 3650 |
| 6 | 0.007 | 0.007 | 0.871 | $Cu_{0.007}Fe_{0.993}Ni_{0.871}Mn_{1.129}O_4$ | 90 | | 4500 | 3410 |
| 7(K2K) | 0 | 0 | 0.861 | $FeNi_{0.861}Mn_{1.139}O_4$ | 91 | | 4730 | 3450 |
| 8(G6) | 0 | 0 | 0.833 | $FeNi_{0.833}Mn_{1.167}O_4$ | 85 | 1090 | 7700 | 3525 |
| 9(K1) | 0 | 0 | 0.763 | $FeNi_{0.763}Mn_{1.237}O_4$ | 83 | | 14040 | 3700 |
| 10 | 0.007 | 0.002 | 0.761 | $Cu_{0.007}Fe_{0.998}Ni_{0.761}Mn_{1.234}O_4$ | 90 | | 8960 | 3630 |
| 11 | 0.015 | 0.005 | 0.759 | $Cu_{0.015}Fe_{0.995}Ni_{0.759}Mn_{1.230}O_4$ | 90 | | 7410 | 3590 |
| 12 | 0.03 | 0.010 | 0.755 | $Cu_{0.03}Fe_{0.99}Ni_{0.755}Mn_{1.225}O_4$ | 93 | | 5670 | 3530 |
| 13(R1) | 0 | 0 | 0.700 | $FeNi_{0.700}Mn_{1.300}O_4$ | 84 | 1200 | 28240 | 3855 |
| 14 | 0.030 | 0.01 | 0.693 | $Cu_{0.03}Fe_{0.99}Ni_{0.693}Mn_{1.287}O_4$ | 90 | | 12690 | 3700 |
| 15 | 0.03 | 0.03 | 0.700 | $Cu_{0.03}Fe_{0.97}Ni_{0.700}Mn_{1.300}O_4$ | 92 | | 10270 | 3660 |
| 16(K3) | 0.03 | 0.01 | 0.627 | $Cu_{0.03}Fe_{0.99}Ni_{0.627}Mn_{1.353}O_4$ | 92 | | 26730 | 3925 |
| 17 | 0.03 | 0.03 | 0.633 | $Cu_{0.03}Fe_{0.97}Ni_{0.633}Mn_{1.367}O_4$ | 92 | | 22690 | 3880 |
| 18 | 0.06 | 0.02 | 0.620 | $Cu_{0.06}Fe_{0.98}Ni_{0.620}Mn_{1.340}O_4$ | — | | 9740 | 3660 |
| 19 | 0.06 | 0.06 | 0.633 | $Cu_{0.06}Fe_{0.94}Ni_{0.633}Mn_{1.367}O_4$ | — | | 15600 | 3765 |
| 20 | 0.15 | 0.05 | 0.60 | $Cu_{0.15}Fe_{0.95}Ni_{0.600}Mn_{1.300}O_4$ | — | | 1600 | 3220 |
| 21 | 0.15 | 0.15 | 0.633 | $Cu_{0.15}Fe_{0.85}Ni_{0.633}Mn_{1.367}O_4$ | — | | 589 | 3020 |
| 22(X1) | 0 | 0 | 0.500 | $FeNi_{0.5}Mn_{1.5}O_4$ | 90 | 1445 | 3 450 000 | 3920 |

We claim:

1. A sintered ceramic for high stability thermistors comprising:
   a ceramic having the general formula $Cu_zFe_{1-y}Ni_xMn_{2-x-z+y}O_4$, where
   z=0.03; y=0.01; and x is selected from the group consisting of 0.862, 0.755, 0.693 and 0.627.

2. A sintered ceramic for high stability thermistors comprising:
   a ceramic having the general formula $Cu_zFe_{1-y}Ni_xMn_{2-x-z+y}O_4$, where
   z=0.007; y=0.002; and x is selected from the group consisting of 0.869 and 0.761.

3. A sintered ceramic for high stability thermistors comprising:
   a ceramic having the general formula $Cu_zFe_{1-y}Ni_xMn_{2-x-z+y}O_4$, where
   z=0.015; y=0.005; and x is selected from the group consisting of 0.867 and 0.759.

4. A sintered ceramic for high stability thermistors comprising:
   a ceramic having the general formula $Cu_zFe_{1-y}Ni_xMn_{2-x-z+y}O_4$, where
   z=0.03; y=0.03; and x is selected from the group consisting of 0.70 and 0.633.

5. A sintered ceramic for high stability thermistors comprising:
   a ceramic having the general formula $Cu_zFe_{1-y}Ni_xMn_{2-x-z+y}O_4$, where
   a values triplet includes z=0.06; y=0.02; and x=0.663.

6. A sintered ceramic for high stability thermistors comprising:
   a ceramic having the general formula $Cu_zFe_{1-y}Ni_xMn_{2-x-z+y}O_4$, where
   z=0.06; y=0.06; and x=0.633.

7. A sintered ceramic for high stability thermistors comprising:
   a ceramic having the general formula $Cu_zFe_{1-y}Ni_xMn_{2-x-z+y}O_4$, where
   z=0.15; y=0.05; and x=0.60.

8. A sintered ceramic for high stability thermistors comprising:
   a ceramic having the general formula $Cu_zFe_{1-y}Ni_xMn_{2-x-z+y}O_4$, where
   z=0.15; y=0.15; and x=0.633.

9. A method for producing a sintered ceramic for high-stability thermistors, which comprises:
   converting a mixture of starting materials MnOx, NiO, $Fe_2O_3$, and copper oxide into a stable ceramic of an iron-nickel-manganese oxide spinel phase with high thermal stability and aging stability, having the general formula $Cu_zFe_{1-y}Ni_xMn_{2-x-z+y}O_4$, where
   $0 < z \leq 1.5$; y=−0.1 to 0.02; and $1 > x > 0.5$.

10. A method for producing a sintered ceramic for high-stability thermistors, which comprises:
    calcining a mixture of nickel carbonate, manganese carbonate, copper oxide and α-iron (III) oxide by heating to over 600° C. in air;
    granulometric preparing of the mixture;
    compression molding of the mixture; and
    producing sintered ceramic bodies from the calcinate by sintering in air or an oxygen atmosphere to yield the general formula $Cu_zFe_{1-y}Ni_xMn_{2-x-z+y}O_4$, where
    $0 < z \leq 1.5$; y=−0.1 to 0.02; and $1 > x > 0.5$.

* * * * *